(12) United States Patent
Bhattacharjya et al.

(10) Patent No.: US 6,522,427 B1
(45) Date of Patent: Feb. 18, 2003

(54) COLOR TABLE MANIPULATIONS FOR CONTOUR REDUCTION

(75) Inventors: Anoop Bhattacharjya, Sunnyvale, CA (US); Tsung-Nan Lin, San Jose, CA (US); Joseph Shu, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/400,787

(22) Filed: Sep. 21, 1999

(51) Int. Cl.[7] .......................... G06F 15/00; G03F 3/08; G06K 9/40
(52) U.S. Cl. .................. 358/1.9; 358/523; 382/266
(58) Field of Search .................. 358/1.9, 515, 518, 358/519, 520, 521, 523, 524, 526, 532, 535, 538, 442, 444; 382/256, 260, 264, 266, 224

(56) References Cited

U.S. PATENT DOCUMENTS

| | | | |
|---|---|---|---|
| 4,941,039 A | * | 7/1990 | E'Erirco ....................... 358/80 |
| 5,063,448 A | * | 11/1991 | Jaffray et al. ............... 358/160 |
| 5,237,402 A | * | 8/1993 | Deshon et al. .............. 358/520 |
| 5,471,324 A | | 11/1995 | Rolleston |
| 5,477,335 A | | 12/1995 | Tai |
| 5,483,360 A | | 1/1996 | Rolleston et al. |
| 5,489,998 A | | 2/1996 | Yamada et al. |
| 5,491,568 A | | 2/1996 | Wan |
| 5,568,269 A | | 10/1996 | Jamzadeh |
| 5,568,571 A | | 10/1996 | Willis et al. |
| 5,649,024 A | | 7/1997 | Goldsmith |
| 5,649,072 A | | 7/1997 | Balasubramanian |
| 5,689,350 A | | 11/1997 | Rolleston |
| 5,729,360 A | * | 3/1998 | Kita et al. ................... 358/500 |
| 5,734,802 A | | 3/1998 | Maltz et al. |
| 5,739,927 A | | 4/1998 | Balasubramanian et al. |
| 5,760,920 A | | 6/1998 | Lin et al. |
| 5,809,181 A | | 9/1998 | Metcalfe |
| 5,809,213 A | | 9/1998 | Bhattacharjya |
| 5,852,678 A | | 12/1998 | Shiau et al. |
| 5,966,461 A | * | 10/1999 | Harrington .................. 382/167 |
| 6,108,008 A | * | 8/2000 | Ohta .......................... 345/431 |
| 6,260,948 B1 | * | 7/2001 | Li et al. ....................... 347/43 |
| 2002/0012003 A1 | * | 1/2002 | Lockeridge et al. ........ 345/581 |

* cited by examiner

Primary Examiner—Madeleine Nguyen
(74) Attorney, Agent, or Firm—Mark P. Watson

(57) ABSTRACT

An apparatus and method for improving a color space transformation between an input device such as a scanner and an output device such as a printer. The color space transformation includes a first three-dimensional look up table that receives color information from the input device and transforms colors specified in an input device color space into colors in a device-independent color space, and a second three-dimensional look up table that receives colors from the first three-dimensional look up table and transforms colors specified in a device-independent color space into colors in an output device color space. The method includes inputting sample images with the input device and outputting those sample images with the output device, identifying areas in the sample images output by the output device where contouring appears, forming a list of colors corresponding to the identified areas, identifying nodes in the second three-dimensional look up table encompassing the list of colors, and smoothing the set of nodes.

28 Claims, 7 Drawing Sheets

COLOR TABLE MANIPULATIONS FOR CONTOUR REDUCTION

CROSS-REFERENCE TO RELATED APPLICATIONS

This application is related to commonly assigned application Ser. No. 09/401,339, filed on the same date as the present application, and entitled "Color Table Manipulations For Smooth Splicing".

BACKGROUND OF THE INVENTION

1. Field of the Invention

The present invention is related to digital color image reproduction systems and more particularly to color calibration of such systems. Typically such systems include an input device such as a scanner for scanning a color image and for producing scanner color signals representing that image, an output device such as a printer for reproducing the color image, and a digital image processor for transforming the scanner color signals into printer color signals. In particular, the present invention relates to a system and method for improving reproduction quality when a scanner and printer are combined to form a copy unit. The present invention also relates to a software program for implementing the method for improving copy quality and media on which the program is recorded or carried.

2. Description of the Related Art

The generation of color documents can be thought of as a two step process: first, the generation of the image by scanning an original document with a color image input terminal or scanner or, alternatively, creating a color image on a work station operated with a color image creation program; and secondly, printing of that image with a color printer in accordance with the colors defined by the scanner or computer generated image.

Each color peripheral device such as a color scanner or a color printer uses a device-dependent color-coordinate system to specify colors. These coordinates are often specified in some color space that is most suitable for mapping the color coordinates to the color-generation mechanism of the device. The term color space refers to an N-dimensional space in which each point in the space corresponds to a color. For example, an RGB color space refers to a three-dimensional device color space in which each point in the color space is formed by additive amounts of red (R), green (G) and blue (B) colorants. Scanner output is commonly transformed to a color space of tristimulus values, i.e., RGB (red-green-blue). Commonly, these values are a linear transformation of the standard XYZ coordinates of CIE color space, or a corrected transform of those values.

In the case of computer generated images, color defined by the user at the user interface of a workstation can be defined initially in a standard color space of tristimulus values. These colors are defined independently of any particular device, and accordingly reference is made to the information as being "device independent".

Printers commonly have an output which can be defined as existing in a color space called CMYK (cyan-magenta-yellow-key or black) which is uniquely defined for the printer by its capabilities and colorants, i.e. it is a device-dependent color space. Printers operate by the addition of multiple layers of ink or colorant in layers on a page. The response of the printer tends to be relatively non-linear. These colors are defined for a particular device, and accordingly reference is made to the information as being "device dependent". Thus, while a printer receives information in a device independent color space, it must convert that information to print in a device dependent color space, which reflects the gamut or possible range of colors of the printer. Printers and other image rendering devices may use more or less than the above-mentioned 4 color channels (i.e., c, m, y, and k) to represent color.

There are many methods of conversion between color spaces, all of which begin with the measurement of printer (or scanner) response to certain input values (or colors). Commonly, a printer is driven with a set of input values reflecting color samples throughout the printer gamut, and the color samples are printed in normal operation of the printer. As previously noted, most printers have non-linear response characteristics.

The information derived is typically placed into three-dimensional look up tables (LUTs) stored in a memory, such as a read-only-memory (ROM) or random-access-memory (RAM). The look up table relates input color space to output color space. The look up table is commonly a three dimensional table since color is defined with three variables. The three variables used to index the LUT correspond to tristimulus values that may represent RGB or a standard color space such as CIE XYZ. RGB space, e.g. for a scanner or computer, is typically defined as three dimensional with black at the origin of a three dimensional coordinate system 0, 0, 0, and white at the maximum of a three dimensional coordinate system. For example, for a 24-bit color system (8-bits/color), white would be located at 255, 255, 255. Each of the three axes radiating from the origin point therefore respectively define red, green, and blue. In the 24-bit system suggested, there will be, however, over 16 million possible colors ($256^3$). There are clearly too many values for a 1:1 mapping of RGB to CMYK. Therefore, the look up tables consist of a set of values which could be said to be the intersections (lattice points, nodes, etc.) for corners of a set of cubes mounted on top of one another. Colors falling within each cubic volume can be interpolated from the nodes forming the cube, through many methods including tri-linear interpolation, tetrahedral interpolation, polynomial interpolation, linear interpolation, and any other interpolation method depending on the desired accuracy of the result, behavior of the function being sampled, and computational cost.

It would be very easy to index (map) device dependent color values or specifications to device independent color values, but that is not what is required. Rather, device independent specifications (i.e. colors specified in a device independent color space) must be mapped to device dependent specifications (i.e. corresponding colors in the device dependent color space). Several problems arise. Of course, the primary problem is that the printer response is not a linear response, and the inverse mapping function may not be unique especially when the dimensions of the input and output color spaces are different. A second problem is that the color space, and therefore the coordinates defined in the color space must be maintained as a uniform grid for maximum efficiency of some interpolation methods.

Accordingly, a multidimensional look up table (LUT) may be constructed which puts device independent input values into a predictable grid pattern. One method of accomplishing this requirement is by an interpolation process referred to as weighted averaging and another method is inverse tetrahedral interpolation.

The technique or method for producing the LUT is selected according the best result that can be obtained for the particular device. For example in a particular printer it may be found that the weighted averaging technique produced a table which gave good color reproduction in one region of color space (the light colors), but not in another (the dark colors). The tetrahedral inversion technique may produce just the complement of this, i.e., it may give good color reproduction where the weighted average technique did not (the dark colors), and give poorer color reproduction of colors where the weighted average technique gave good color reproduction (the light colors).

Similar to the above problem, it has been noted that often, after a change in process parameters due to time, change of materials, refilling toner, etc., a change in calibration is required only in a portion of the overall color gamut of a printer. Re-calibration of the entire space is costly in terms of processing time. It is desirable to only re-calibrate a portion of the color space, or alternatively, to use the best portions of the color space mapping.

Further, we have found that when an independently calibrated scanner is put together with an independently calibrated printer, certain reproduction artifacts turn up in the copy. These include contouring artifacts that appear in certain types of copied images, such as skin tones and sky tones. Such artifacts are quite common if the input and output devices have been calibrated using different standard spaces, e.g., a scanner may be calibrated to be linear with respect to luminance while a printer may be calibrated to be linear with respect to ink density.

OBJECTS OF THE INVENTION

Therefore, it is an object of the present invention to overcome the aforementioned problems.

It is an object to provide a calibration system that effectively calibrates an input device/output device system where the input device and output device have been separately calibrated.

Another object is to provide an effective system for revising the color transformation LUTs for only those colors that present problems when the input and output device are combined, while maintaining the calibration for the balance of the color space.

A further object of the invention is to provide an effective system for reducing contouring artifacts that arise when a particular input device is combined with a particular output device.

Yet a further object of the invention is to provide a software program for performing the method of the present invention. The software program can be stand-alone, resident on the image processing unit of the present invention, recorded on media readable by the image processing unit or embodied on a carrier wave that can be input to the image processing unit.

SUMMARY OF THE INVENTION

The present invention is directed to a calibration system in which any one of a number of types of scanners can be combined by a customer with any one of a number of types of printers to form a color reproduction system. Since the scanner-type/printer-type combination is not known until the customer orders his system, color calibration is performed in two steps. Each type of scanner is calibrated alone and each type of printer is calibrated alone. Then, when the customer orders his combination, the selected scanner/printer combination is further calibrated as a unit. However, this further calibration is limited to certain colors in order to preserve as much as possible the original calibration of the individual units (scanner and printer) forming the combined system.

The first part of the color calibration is as follows. With reference to FIGS. 2A, 2B and 2C, the scanner 18 (e.g. a scanner representative of a type/model of scanners) is calibrated to form a 3D look-up-table (LUT) 40 that maps the scanner colors in a device dependent color space, e.g. RGB, to a device independent color space, e.g. Lab or XYZ (FIG. 2A). Similarly, the printer 30 (e.g. a printer representative of a type/model of printers) is calibrated to form a 3D LUT 42 that maps input colors in a device independent color space, e.g. Lab or XYZ, to a device dependent color space, e.g. RGB (FIG. 2B). In the printer calibration, the RGB values are also mapped in 3D LUT 44 to a device dependent color space suitable to a device that uses inks, e.g. CMYK. The resultant cmyk values are further individually mapped using 1D LUTs 46 to provide the cmyk values that drive the printer. The 3D LUT 44 is designed for a reference printer or canonical printer that is set up in the factory and is intended to represent and be the standard for a given type and model. The 1D LUTs 46 enable the user to adjust the color profile of his own printer which may vary slightly from the reference printer set up in the factory. In another implementation, the tables 3D LUT 42 and 3D LUT 44 may be combined as a single 3D LUT table that directly maps Lab to CMYK.

In theory, when the customer selects a scanner 18 type/model and printer 30 type/model, they can be combined with the various LUTs concatenated together (shown as block 50 in FIG. 2C) to provide a copier where an image can be scanned by the scanner and faithfully reproduced when printed by the printer. In practice, such a system works well for most colors. If a color is slightly lighter or darker than the original, for example, it usually is not that noticeable. However, in colors that are used to produce skin tones or the sky, for example, sharp gradients result in noticeable contours in the reproduced image. In facial images, for example, since there are gradual color changes throughout the original facial image, if a reproduced color dot is slightly lighter than the original and a near reproduced dot is slightly darker then the original, then the contrast is magnified and the gradual color changes are no longer smooth but instead are represented as contour lines. Sharp gradients in smooth color regions typically represent areas of the color space that do not have enough bits to represent visually distinct colors. Contours visible in these regions may be reduced or eliminated by locally adjusting the number of bits allocated to represent different regions in color space.

The present invention is directed to reducing the contouring effect that results when combining the scanner and printer that have not been calibrated in a closed loop. The contouring results from color quantization issues as explained in the previous paragraph. Color quantization can be altered by adjusting the LUTs present in the copier system. In the particular scenario illustrated in FIGS. 2A through 2C, the three LUT tables involved are: (a) the mapping from scanner RGB space to printer RGB space, (b) the RGB to CMYK mapping table, and (c) the 1D CMYK LUTs.

The present invention reduces the problem of contouring in a two-part process. In the first part, we identify the colors that will make up the skin tones or sky tones, etc. These are the areas of concern where contours will be visible. We do this empirically by test printing a number of images with faces, sky, etc. to identify the colors that lie in the facial or sky regions where contouring is observed. We then locate those colors in the RGB color space of the scanner. Next we map those colors from scanner RGB color space to printer RGB color space. In order to reduce contouring we need to ensure that those points of interest in the printer RGB color space have no large transitions with their neighbors, i.e. the transitions should be smooth.

To ensure smoothness in the color regions of interest, we identify the nodes in the printer RGB color space LUT that bound the areas in which the colors of interest fall. We then apply iterative low pass filtering to these nodes and their neighboring nodes. Basically, the nodes are moved until they are nearly in the center of their neighbors. The low pass filtering is applied iteratively until the nodes of interest are acceptably well centered. This ensures that, for those colors that appear in image areas where contouring is noticeable to the viewer, the LUT table entries that form the cubes encompassing those colors will be fairly equidistant from their neighboring entries. The LUT entries for all other colors remain unchanged. This results in a modified or corrected printer RGB LUT.

The second part of the process is to pass all the colors of interest through the corrected printer RGB 3D LUT and then through the RGB-to-CMYK 3D LUT to identify all the CMYK values that correspond to the colors of interest (i.e. skin tones or sky colors). We then identify the nodes in the printer 1D CMYK LUTs that bound the areas in which the colors of interest fall. We then apply iterative low pass filtering to these nodes and their neighboring nodes. Again, the nodes are basically moved so that they are nearly in the center of their neighbors. The low pass filtering is applied iteratively until the nodes of interest are acceptably well centered. This ensures that, for those colors that appear in image areas where contouring is noticeable to the viewer, the 1D LUT table entries for those colors will be fairly equidistant from their neighboring entries. The 1D LUT entries for all other colors remain unchanged. This results in a modified or corrected printer C, M Y, and K color space.

The overall result is an improvement in the reproduction quality of the color copier system formed by a scanner/printer combination.

The present invention includes a software program for performing the method of improved color reproduction quality. The software program can be stand-alone, resident on the image processing unit of the present invention, recorded on media readable by the image processing unit or embodied on a carrier wave that can be input to the image processing unit.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

DESCRIPTION OF THE PREFERRED EMBODIMENTS

Figure 1A:
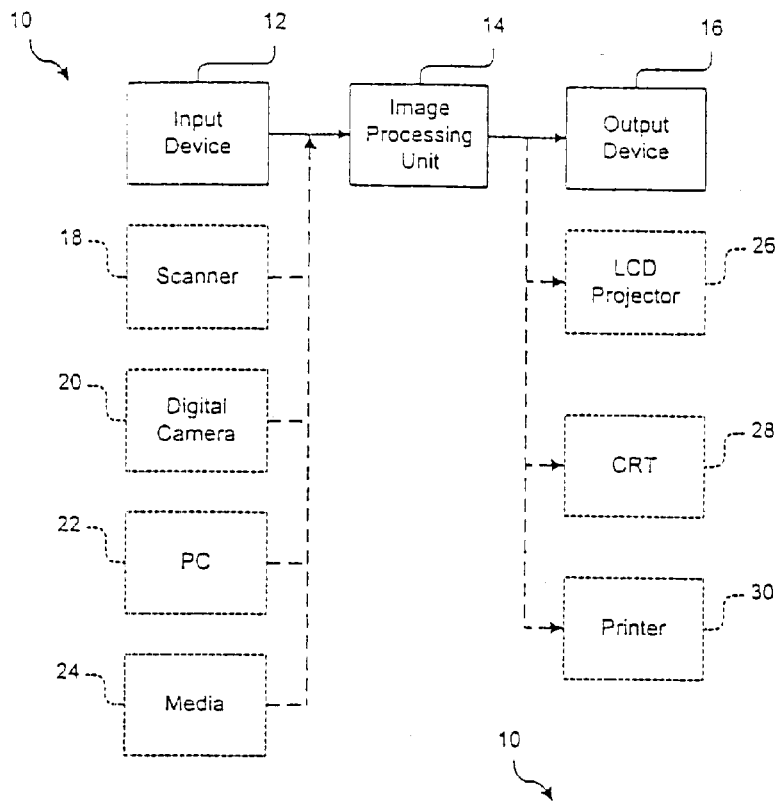
FIGS. 1A, 1B and 1C are block diagram representations of various general configurations of an image handling unit of the present invention.
Figure 1B:
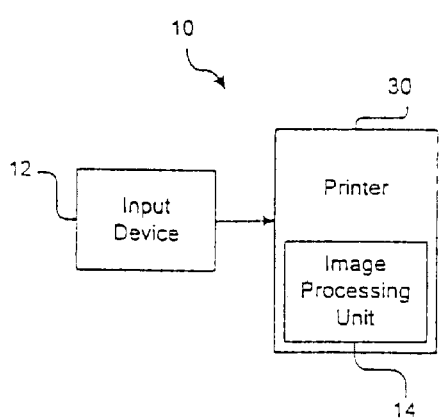
Figure 1C:
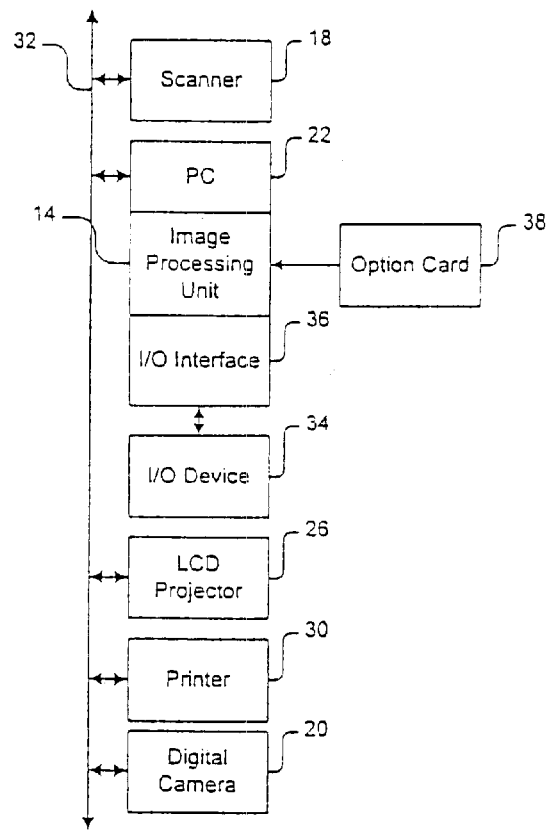
Figure 2A:
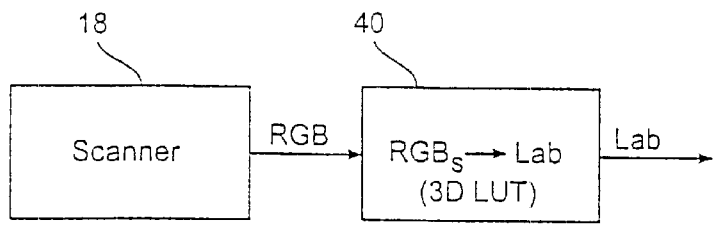
FIGS. 2A, 2B and 2C are block diagram representations of the color space transformation tables utilized in the present invention.
Figure 2B:
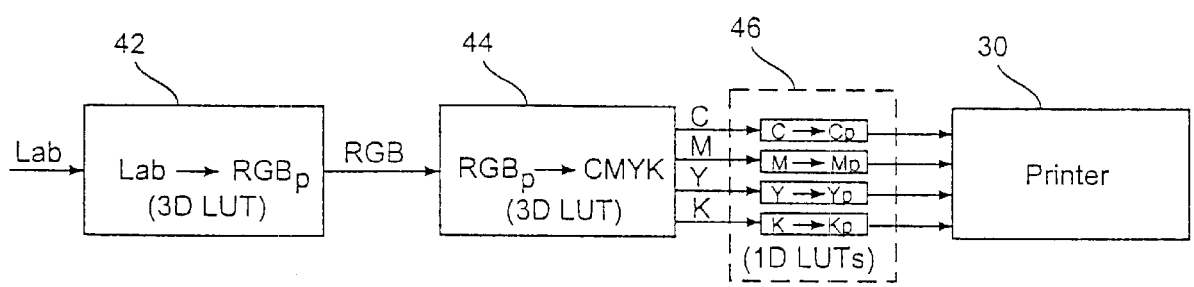
Figure 2C:
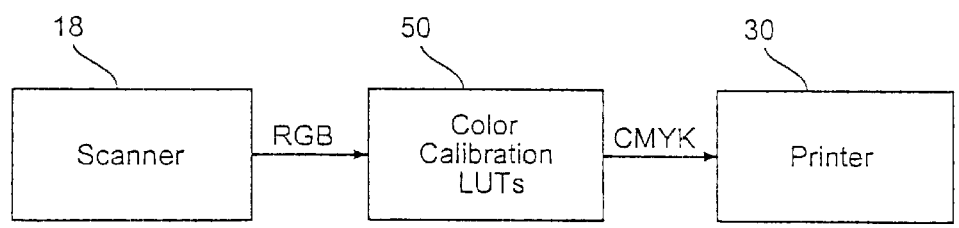

Reference is now made to FIGS. 1A, 1B and 1C which show the general configuration of an image handling unit 10. As shown in FIG. 1A, imaging handling unit 10 has three major components, an input device for providing a source image S, an image processing unit 14 for processing the source image and an output device 16 for displaying or printing the processed image. The input device 12 can take various forms such as a scanner 18, digital camera 20, personal computer (PC) 22 or media 24 (e.g. hard disk or diskette, floppy disc, optical disc). The output device 16 can also take various forms such as an LCD projector 26, CRT 28 or printer 30.

The image processor 14 may be implemented in hardware with discrete components, software, firmware, application specific integrated circuits (ASICs), or any combination thereof. Also, the functional blocks of the image processor are divided in this specification for convenience of description only. The functional and physical boundaries of these blocks will vary from device to device. For example, FIG. 1B shows the image processor physically integrated with the printer 30. Portions of the image processor may be associated functionally more with the input device than with the output device or vice versa. FIG. 1C shows an embodiment of an image handling unit 10 with the image processor formed as part of a personal computer (PC) 22 which may control operation of and communication between the image processing unit, LCD projector, scanner, printer, and control of and communication with peripheral equipment such as I/O device 34, each connected directly or indirectly to a PC Bus 32. In this embodiment, the source image may be have been previously stored (and perhaps enhanced through processing) in an I/O device 34 and can be loaded into the PC through I/O interface 36, or the image may be captured with a digital image input device such as a digital camera 20. In addition, the image processing unit 14, in the form of software, may be loaded into the PC's memory from an external storage device, i.e. I/O device 34. Alternately, the image processing unit in the form of hardware, ASIC, firmware, etc. or combination thereof can be embodied on an option card 38 that can be inserted into an available PC card slot.

While the present invention is applicable to any such device having these basic components, for the sake of illustration only the invention will be described in the environment of a particular image handling unit 10 shown in FIG. 3. The image handling unit 10 includes scanner 18, printer 30 and image processing unit 14 that, in part, provides an interface between them. As discussed above, image processing unit 14 is shown as a separate block with a number of separate functional units contained therein. However, image processing unit 14 or portions thereof may be physically located in the scanner and/or printer. Also, the illustrative image processing unit 14 is shown with internal busses on which status and control information may be communicated, as well as color image signals.

Figure 3:
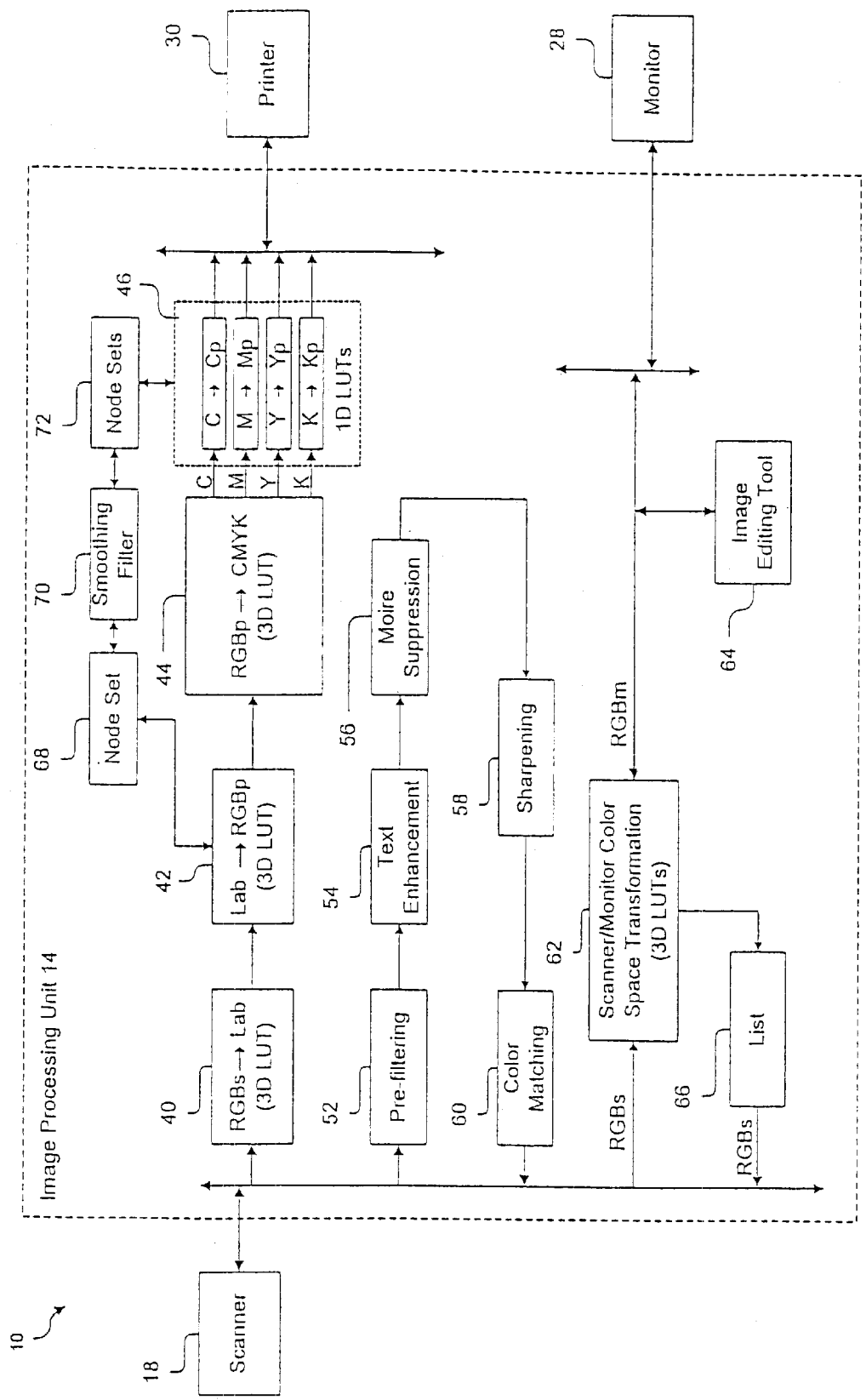
FIG. 3 is a schematic block diagram of a portion of the major functional components of the present invention.

As shown in FIG. 3, the image processing unit has an image processing pipeline with a number of functional components. The functional blocks shown are illustrative but not limiting and the present invention may be utilized in systems having more or less processing blocks, which may be ordered in the pipeline differently than in the example shown. The image processing pipeline may include, for example, pre-filtering unit 52, text enhancement unit 54, moire suppression unit 56, sharpening unit 58 and color matching unit 60. In addition, the processing pipeline will include a color-space-transformation pipeline including 3D LUTs 40, 42 and 44, and 1-D LUTs 46.

The color-space-transformation pipeline enables conversion of colors defined in the scanner color space to colors defined in the printer color space. The scanner output is commonly defined in RGB (red-green-blue) color space. A canonical scanner representative of a type/model of scanners is calibrated to form a 3D look-up-table (LUT) 40 that converts the scanner colors $RGB_s$ to colors in a device independent color space, such as CIELab (Lab). Other frequently used device independent color spaces are CIEXYZ or CIELUV space. There are various methods known in the art for deriving color calibration look-up tables, and a detailed discussion of such methods is not necessary for an understanding of the present invention.

The output of LUT 40 will be a color defined in Lab space. LUT 42 converts those color coordinates in Lab space into corresponding color coordinates in an RGB space for the printer. These printer colors are designated as $RGB_P$. However, it is typically more useful to define the printer output in a CMYK (cyan-magenta-yellow-key or black) color space that is uniquely defined for the printer according to its physical attributes and colorants. A canonical printer representative of a type/model of printers is calibrated to form a 3D look-up-table (LUT) 44 that converts the printer colors $RGB_P$ to colors in CMYK color space. This calibration is done in a factory with a printer that is representative of a particular type and model. However, printers, even of the same type and model, tend to vary somewhat one to another. The 1D LUTs 46 are provided to accommodate such variations by adjusting the CMYK levels on a per-channel basis. Thus, for a particular printer 30, the 1D LUTs modify the 3D LUT 44, but only for particular colors or only in a limited way while maintaining most of the calibration that was done for the factory canonical printer.

The problem that arises is that contouring may result from any one of the above-mentioned look-up tables. Remember that unlike a conventional copier, where the scanning function and printing function are in a physically integrated device that permits an exact closed-loop calibration, the system shown in FIG. 3 cannot be exactly calibrated until the system is put together with a particular scanner and a particular printer. Remember also that look-up-tables are too small to map one-to-one all colors in one color space to all colors in another color space. In a typical 24-bit system, for example, there will be over 16 million colors. Thus, only a limited number of sample colors are used to build the tables. The entries in the tables are lattice points or nodes forming cubes (3-dimensional volumes) that divide up the color space. When an actual color is encountered, it will be represented by one of the lattice points or more likely fall somewhere within one of these cubes, in which case its value in the device dependent color space must be approximated from the lattice points forming the cube in which it falls. A variety of interpolation techniques are known in the art for computing the color values of non-lattice points. These include, for example, trilinear, prism, and tetrahedral interpolation.

The present invention comes into play when the system of FIG. 3 is put together with a particular scanner and a particular printer. The LUTs that are built for the particular scanner and particular printer will generally produce good results when they are concatenated to form the color space transformation pipeline shown in FIG. 3. However, when put into use it may be found that contours (contour artifacts) appear in regions where there should be smooth transitions or gradations. For example, it may be that for facial images or sky images, contour lines, i.e. noticeably large gradients, show up in the copy where they do not appear in the original. These contour artifacts can appear in dark regions as well, such as dark green grasses.

The present invention solves this problem by first empirically determining which colors are used to produce images (e.g. sky and facial images, dark green grasses, etc.) where contouring would be noticeable or objectionable to the ordinary observer. There is no way to know this a priori. We must use the system once it is put together to see how it operates under usual working conditions. We first make the assumption that the scanner is more stable than the printer. That is, the scanner 18 of image processing unit 10 is more likely to behave like the factory canonical scanner than is the printer 30 likely to behave like the factory canonical printer. Thus, we concentrate on the color transformation into printer color space, as will be discussed hereinafter.

Figure 4:
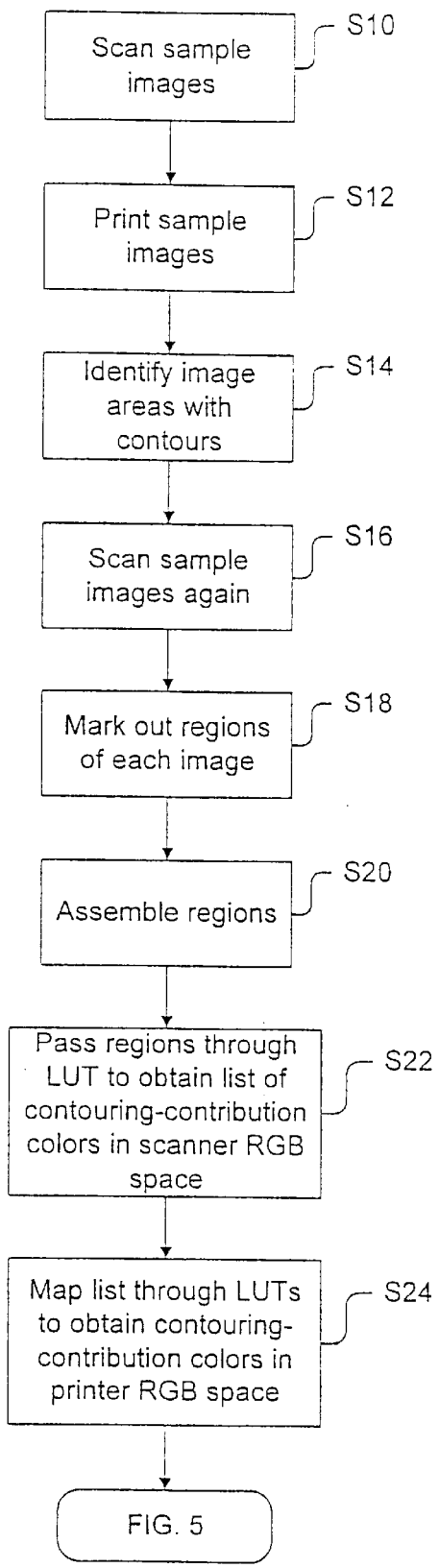
FIGS. 4, 5 and 6 are flowcharts showing the general steps of the method of the present invention.
Figure 5:
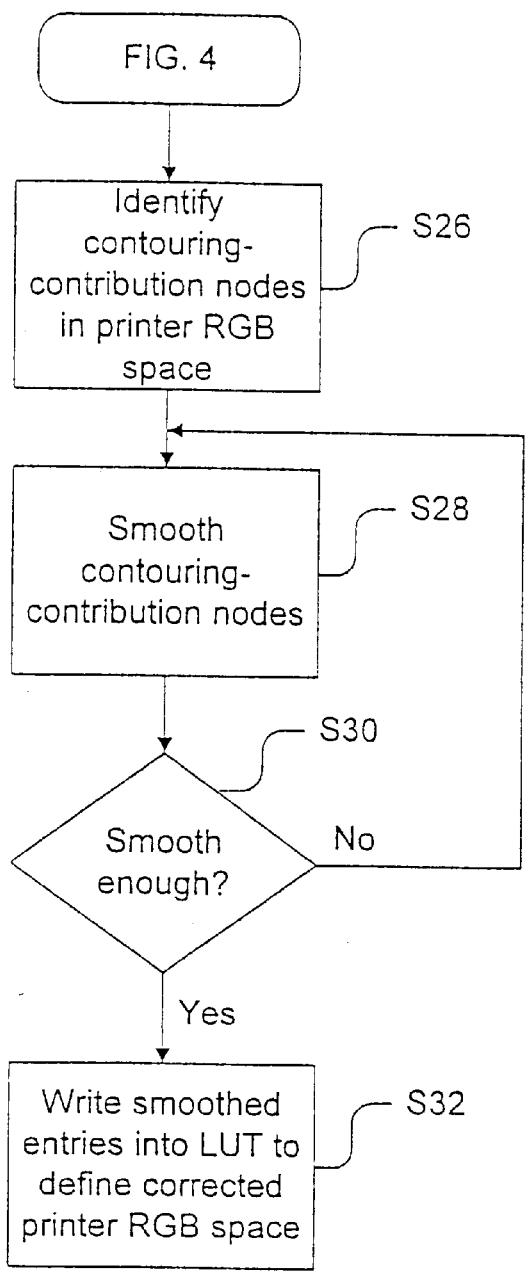

With reference to FIGS. 3, 4 and 5, in order to identify the colors of interest, we scan a number of sample images (step S10) with scanner 18 (i.e. pictures, photos, etc.) that contain a wide variety of tones such as skin and sky tones, dark green grasses, etc., and we print those images (step S12) on printer 30. We then observe and identify those areas where distracting contours appear (step S14). This is an empirical test and its outcome depends to some degree on the observer. It also depends on the universe of sample images. The opportunity to identify all colors that may be involved in producing contouring artifacts increases with a large and diverse sample image universe.

We then mark out regions in the sample images where the contouring artifacts appear. This can be done by scanning each image (step S16) and displaying it on a screen, i.e. CRT or computer monitor 28. The colors represented in scanner color space $RGB_s$ are mapped into monitor color space $RGB_M$ by scanner/monitor color transformation LUT 62. We "mark out" the regions of interest (step S18) in each displayed image using, for example, a cropping function of an image editing tool 64, such as Adobe Photoshop, which can be stored in image processing unit 14. Remember that these regions of interest are those areas of the image that we found had contouring artifacts when we printed the image on printer 30. We can then assemble these regions of interest (step S20), i.e. cropped segments, again using an image editing tool 64. This assembly of regions of interest then corresponds to all colors that are involved in forming images where contouring artifacts appear in our system. For the purpose of explanation, we will refer to this set of colors as contouring-contribution colors. From the physical location of the selected regions on the page, the colors of interest in the scanner space, $RGB_S$, are identified and collected in a list 66 of contouring-contribution colors (step S22).

Now that we have identified the set of contouring-contribution colors in the scanner space we then identify them in the printer color space $RGB_P$. We do this by mapping the colors in list 66 through LUTs 40 and 42, which results in a set of contouring-contribution colors in the printer color space $RGB_P$ (step S24). As discussed above, only a small subset of colors in a color space correspond exactly to entries (lattice points, nodes) in the 3 look-up tables. Most colors fall within cubes defined by the nodes. Thus, we identify all the nodes in the printer color space that form the three-dimensional cubes in which the contouring-contribution colors are located (step S26). For the purpose of explanation, we will refer to this set of nodes as contouring-contribution nodes, which may be temporarily stored in node set 68.

Contouring results when two colors that are close to each other in value in the original image end up having not near enough values after they are passed through the color space transformation tables. As discussed above, the tables can only provide approximations since most colors falling within cubes must be interpolated. Further, the color space of the input device, e.g. scanner 18 is not coextensive with the color space of the output device, e.g. printer 30. As a result, even though the LUT entries or nodes in the source or input space, i.e. $RGB_S$, may be chosen to be uniformly spaced, the corresponding LUT entries or nodes in the destination or output space, i.e. $RGB_P$, will not necessarily be evenly spaced. In fact it will most likely result in an uneven and irregular 3-D LUT representing the output space. This can result in two colors that are near in value in the original image and input space being further away in value in the output space. While this discrepancy is not noticeable for most colors, it is noticeable in colors that are used in some types of images, e.g. facial images, sky images, dark green grass images, etc. In these types of images, the color transition between near pixels should be small. Any large gradients show up as contour lines.

To remove or reduce the large gradients between near color values in the output color space, we smooth out the nodes in the output color space, i.e. printer $RGB_P$, with smoothing filter 70. However, we do this smoothing only for the contouring-contribution nodes identified in the previous steps. The remaining nodes in the printer space are left untouched to preserve the original color space transformation that works well for most colors. The contouring-contribution nodes are smoothed by applying a low pass filter (step S28), for example. Any type of smoothing filter can be applied so long as each contouring-contribution node ends up nearly in the center of its neighbors after filtering. An example smoothing or low pass filter would be to assign a node to a new position that is a weighted sum of its old position plus each of its neighbor's positions. This smoothing or low pass filtering of the contouring-contribution nodes can be applied iteratively a number of times until a desired smoothness effect or level is achieved. For example, after one pass of the filter, the variance in the distance between a contouring-contribution node and its neighbors can be compared against a threshold to determine if a sufficient smoothness level has been achieved (step S30). If not, we apply the low-pass filter again (step S28), and so on. The revised, smoothed node entries in node set 68 are then written back into LUT 42, which then defines a corrected printer color space $RGB_P'$ (step S32).

Figure 6:
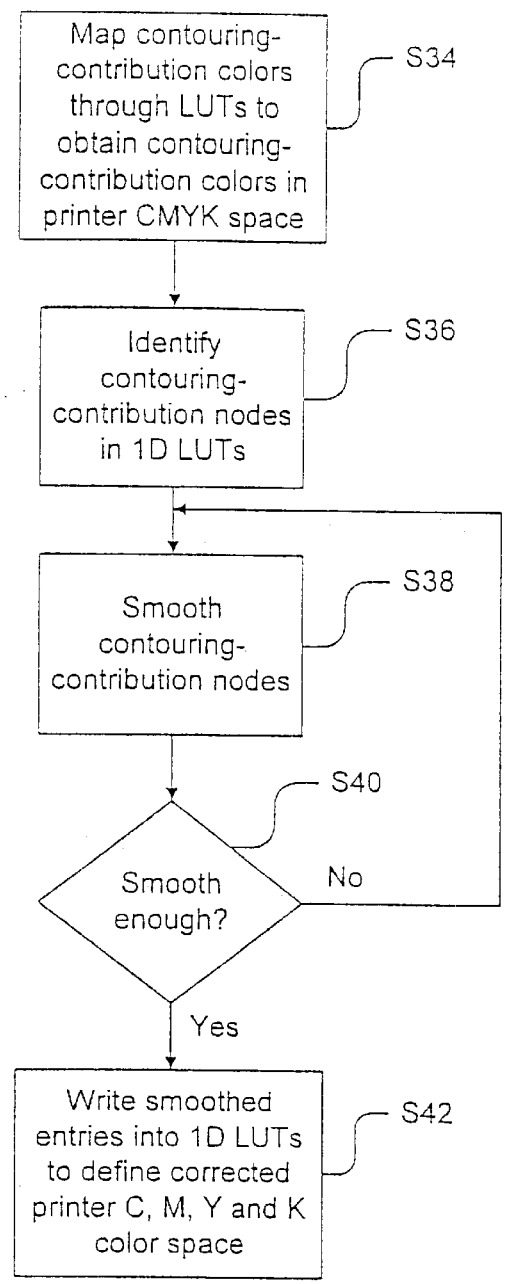

This takes care of the contouring effect that may arise from LUT 42. However, we preferably also address the contouring effect that may arise from the 1-D LUTs 46. To do this we again map the list 66 of contouring-contribution colors in the scanner space $RGB_s$ through LUT 40 and LUT 42 (as revised in our smoothing steps), and then through LUT 44, which results in a set of contouring-contribution colors in printer CMYK space (FIG. 6, step S34). Each of these contouring-contribution colors will have a C (cyan) value, M (magenta) value, Y (yellow) value and (K) black value, which are mapped separately through separate channels through individual C, M, Y and K 1D LUTs 46. Thus, for each of LUTs 46 we identify the nodes that bound the one dimensional line segments in which each of the contouring-contribution colors (i.e. the individual C, M, Y and K values) fall (step S36). These can be stored as separate node sets 72.

Again we smooth these contouring-contribution nodes. The remaining nodes in the C, M, Y and K 1D LUTs 46 are left untouched to preserve the original color space transformation that works well for most colors. The contouring-contribution nodes are smoothed by applying a low pass filter 70 (step S38). Again, any type of smoothing filter can be applied so long as each contouring-contribution node ends up nearly in the center of its neighbors after filtering. An example low pass filter would be to assign a node to a new position that is a weighted sum of its old position plus each of its neighbor's positions. This smoothing or low pass filtering of the contouring-contribution nodes can be applied iteratively a number of times until a desired smoothness effect is achieved (steps S38 and S40). The revised, smoothed node entries are then written back into C, M, Y and K 1D LUTs 46, which then define a corrected printer color space $C_P'$, $M_P'$, $Y_P'$, and $K_P'$ (step S42).

Figure 7:
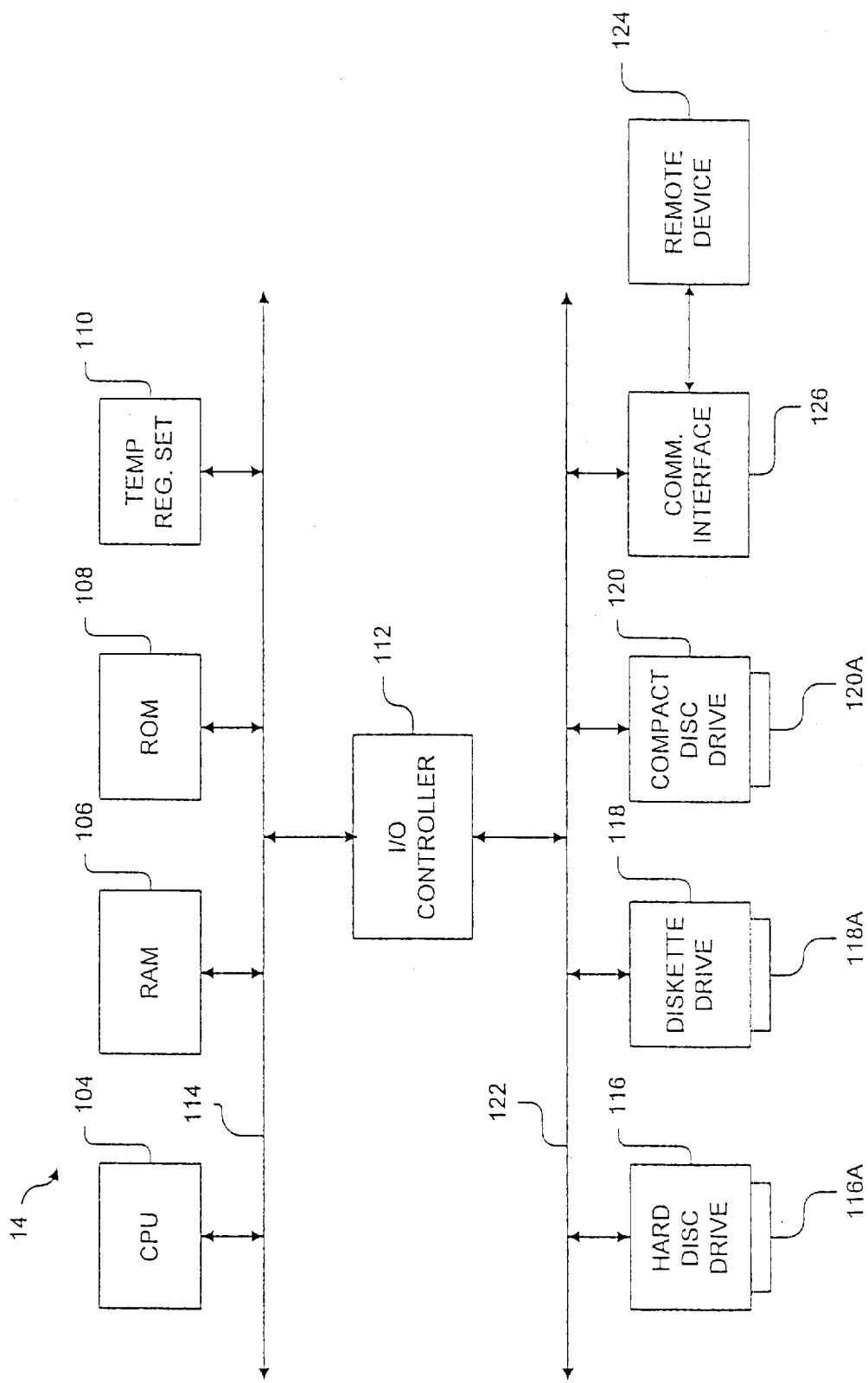
FIG. 7 is a schematic block diagram of another portion of the major functional components of the present invention.

While in the foregoing example the image processing unit 14 is shown as a separate block comprising its various functional units, image processing unit 14 may also comprise parts of other system components such as personal computer 22. As shown in FIG. 7, it may further include, for example, a central processing unit (CPU) 104, memories including a random-access-memory (RAM) 106, read-only memory (ROM) 108 and temporary register set 110, and an input/output controller 112, all connected to an internal bus 114. Although for the sake of illustration each of the above units are shown separately, these functional units may form part or all of the various functional units previously described such as the look up tables 40, 42, etc., smoothing filter 70, image editing tool 64, node set 68, etc. Further, depending on the nature of the system, e.g. a scanner and printer as part of a centrally controlled network, the functional units may be part of a general purpose computer programmed to control the scanning and printing devices. Additionally, it will be appreciated that these functional units may be implemented with discrete components, application specific integrated circuits, processors executing appropriate software and the like or any combination thereof.

Each of the methods of the present invention are implemented, in one embodiment, in a software program or programs outlined in the flow diagrams and their accompanying descriptions set forth above. These programs as well as operating system software and/or application specific software for operating the scanner 18, printer 30 and/or the image processing unit 14 and/or the various functional units described herein may be stored in any combination of the memories 106, 108 and 110 or may be stored externally in one or more of the I/O units including hard disc drive unit 116, diskette drive unit 118, and compact disc drive 120, each connected to I/O Bus 122. Software programs for operating the various functional units and/or for implementing the method of the present invention may be stored on a medium such as hard disc 116A, diskette 118A or compact disc 120A, or may be stored at a remote device 124 and input on a carrier wave through communications interface 126.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An image processing apparatus for improving a color space transformation between an input device and an output device, comprising:

an input device that receives a plurality of sample images;

a first three-dimensional look up table that receives sample image colors representing said sample images from said input device and transforms said sample image colors, which are specified in an input device color space, into sample image colors in a device-independent color space;

a second three-dimensional look up table that receives said sample image colors in a device-independent color space from said first three-dimensional look up table and transforms said sample image colors in a device-independent color space into sample image colors in an output device color space;

an output device that receives said sample image colors in said output device color space and outputs said sample images;

a marking unit for identifying regions of sample images where contouring appears when said sample images are output from said output device;

a list of colors corresponding to said identified regions;

a set of nodes in said second three-dimensional look up table that encompass said list of colors; and a filter that smoothes said set of nodes in said second three-dimensional look up table.

2. An apparatus according to claim 1 further comprising:

a plurality of one-dimensional look up tables, each of which receives one component of color information from said second three-dimensional look up table and transforms said one component into a unique output device color component;

a plurality of sets of nodes corresponding to said plurality of one-dimensional look up tables that encompass said list of colors; and wherein said filter smoothes said plurality of sets of nodes in said corresponding plurality of one-dimensional look up tables.

3. An apparatus according to claim 1 wherein said marking unit comprises a display device.

4. An apparatus according to claim 1 wherein said marking unit comprises an image editing tool.

5. An apparatus according to claim 1 wherein said input device is a scanner.

6. An apparatus according to claim 1 wherein said output device is a printer.

7. A method of improving a color space transformation between an input device and an output device wherein the color space transformation includes a first three-dimensional look up table that receives sample image colors representing sample images from said input device and transforms said sample image colors, which are specified in an input device color space, into sample image colors in a device-independent color space, and a second three-dimensional look up table that receives said sample image colors in a device independent color space from said first three-dimensional look up table and transforms said sample image colors specified in a device-independent color space into sample image colors in an output device color space, comprising:

inputting said sample images with said input device;

outputting said sample images with said output device;

identifying areas in said sample images output by said output device where contouring appears;

forming a list of colors corresponding to said identified areas;

identifying a set of nodes in said second three-dimensional look up table encompassing said list of colors; and smoothing said set of nodes.

8. A method as in claim 7 wherein said step of identifying areas in said sample images where contouring appears comprises:

displaying said sample images; and marking out regions in said sample images where contouring appears.

9. A method as in claim 8 wherein said step of forming a list of colors comprises identifying colors within said marked out regions in said input device color space.

10. A method as in claim 7 wherein said step of identifying nodes in said second three-dimensional look up table comprises passing said list of colors through said first three-dimensional look up table.

11. A method as in claim 7 wherein said step of smoothing said nodes comprises low pass filtering said nodes.

12. A method as in claim 7 wherein said step of smoothing said nodes comprises low pass filtering said nodes to produce smoothed nodes, checking the smoothness of said smoothed nodes, and low pass filtering said smoothed nodes.

13. A method as in claim 7 wherein said color space transformation includes a plurality of one-dimensional look up tables, each of which receives one component of color information from said second three-dimensional look up table and transforms said one component into a unique output device color component, and further comprising:

identifying a plurality of sets of nodes corresponding to said plurality of one-dimensional look up tables that encompass said list of colors; and smoothing said plurality of sets of nodes in said corresponding plurality of one-dimensional look up tables.

14. A method as in claim 7 wherein said step of inputting said sample images comprises scanning said sample images.

15. A method as in claim 7 wherein said step of outputting said sample images comprises printing said sample images.

16. A medium readable by a machine embodying a program of instructions executable by said machine to perform a method of improving a color space transformation between an input device and an output device wherein the color space transformation includes a first three-dimensional look up table that receives sample image colors representing sample images from said input device and transforms said sample image colors, which are specified in an input device color space, into sample image colors in a device-independent color space, and a second three-dimensional look up table that receives said sample image colors in a device independent color space from said first three-dimensional look up table and transforms said sample image colors specified in a device-independent color space into sample image colors in an output device color space, the method comprising:

inputting said sample images with said input device;

outputting said sample images with said output device;

identifying areas in said sample images output by said output device where contouring appears;

forming a list of colors corresponding to said identified areas;

identifying a set of nodes in said second three-dimensional look up table encompassing said list of colors; and smoothing said set of nodes.

17. A medium as in claim 16 wherein in said method said step of identifying areas in said sample images where contouring appears comprises:

displaying said sample images; and marking out regions in said sample images where contouring appears.

18. A medium as in claim 17 wherein in said method said step of forming a list of colors comprises identifying colors within said marked out regions in said input device color space.

19. A medium as in claim 16 wherein in said method said step of identifying nodes in said second three-dimensional look up table comprises passing said list of colors through said first three-dimensional look up table.

20. A medium as in claim 16 wherein in said step of smoothing said nodes comprises low pass filtering said nodes.

21. A medium as in claim 16 wherein in said method said step of smoothing said nodes comprises low pass filtering said nodes to produce smoothed nodes, checking the smoothness of said smoothed nodes, and low pass filtering said smoothed nodes.

22. A medium as in claim 16 wherein in said method said color space transformation includes a plurality of one-dimensional look up tables, each of which receives one component of color information from said second three-dimensional look up table and transforms said one component into a unique output device color component, and further comprising:

identifying a plurality of sets of nodes corresponding to said plurality of one-dimensional look up tables that encompass said list of colors; and smoothing said plurality of sets of nodes in said corresponding plurality of one-dimensional look up tables.

23. A medium as in claim 16 wherein in said method said step of inputting said sample images comprises scanning said sample images.

24. A medium as in claim 16 wherein in said method said step of outputting said sample images comprises printing said sample images.

25. A computer program embodied in a carrier wave for implementing a method of improving a color space transformation between an input device and an output device wherein the color space transformation includes a first three-dimensional look up table that receives sample image colors representing sample images from said input device and transforms said sample image colors, which are specified in an input device color space, into sample image colors in a device-independent color space, and a second three-dimensional look up table that receives said sample image colors in a device independent color space from said first three-dimensional look up table and transforms said sample image colors specified in a device-independent color space into sample image colors in an output device color space, the method comprising:

inputting said sample images with said input device;

outputting said sample images with said output device;

identifying areas in said sample images output by said output device where contouring appears;

forming a list of colors corresponding to said identified areas;

identifying nodes in said second three-dimensional look up table encompassing said list of colors; and smoothing said set of nodes.

26. A computer program embodied on a carrier wave as in claim 25 wherein in said method said color space transformation includes a plurality of one-dimensional look up tables, each of which receives one component of color information from said second three-dimensional look up table and transforms said one component into a unique output device color component, and further comprising:

identifying a plurality of sets of nodes corresponding to said plurality of one-dimensional look up tables that encompass said list of colors; and smoothing said plurality of sets of nodes in said corresponding plurality of one-dimensional look up tables.

27. A computer program for implementing a method of improving a color space transformation between an input device and an output device wherein the color space transformation includes a first three-dimensional look up table that receives sample image colors representing sample images from said input device and transforms said sample image colors, which are specified in an input device color space, into sample image colors in a device-independent color space, and a second three-dimensional look up table that receives said sample image colors in a device independent color space from said first three-dimensional look up table and transforms said sample image colors specified in a device-independent color space into sample image colors in an output device color space, the method comprising:

inputting said sample images with said input device;

outputting said sample images with said output device;

identifying areas in said sample images output by said output device where contouring appears;

forming a list of colors corresponding to said identified areas;

identifying nodes in said second three-dimensional look up table encompassing said list of colors; and smoothing said set of nodes.

28. A computer program as in claim 27 wherein in said method said color space transformation includes a plurality of one-dimensional look up tables, each of which receives one component of color information from said second three-dimensional look up table and transforms said one component into a unique output device color component, and further comprising:

identifying a plurality of sets of nodes corresponding to said plurality of one-dimensional look up tables that encompass said list of colors; and smoothing said plurality of sets of nodes in said corresponding plurality of one-dimensional look up tables.

* * * * *